Feb. 25, 1930.   C. A. LEE   1,748,422
LOCKING MECHANISM
Filed April 4, 1928
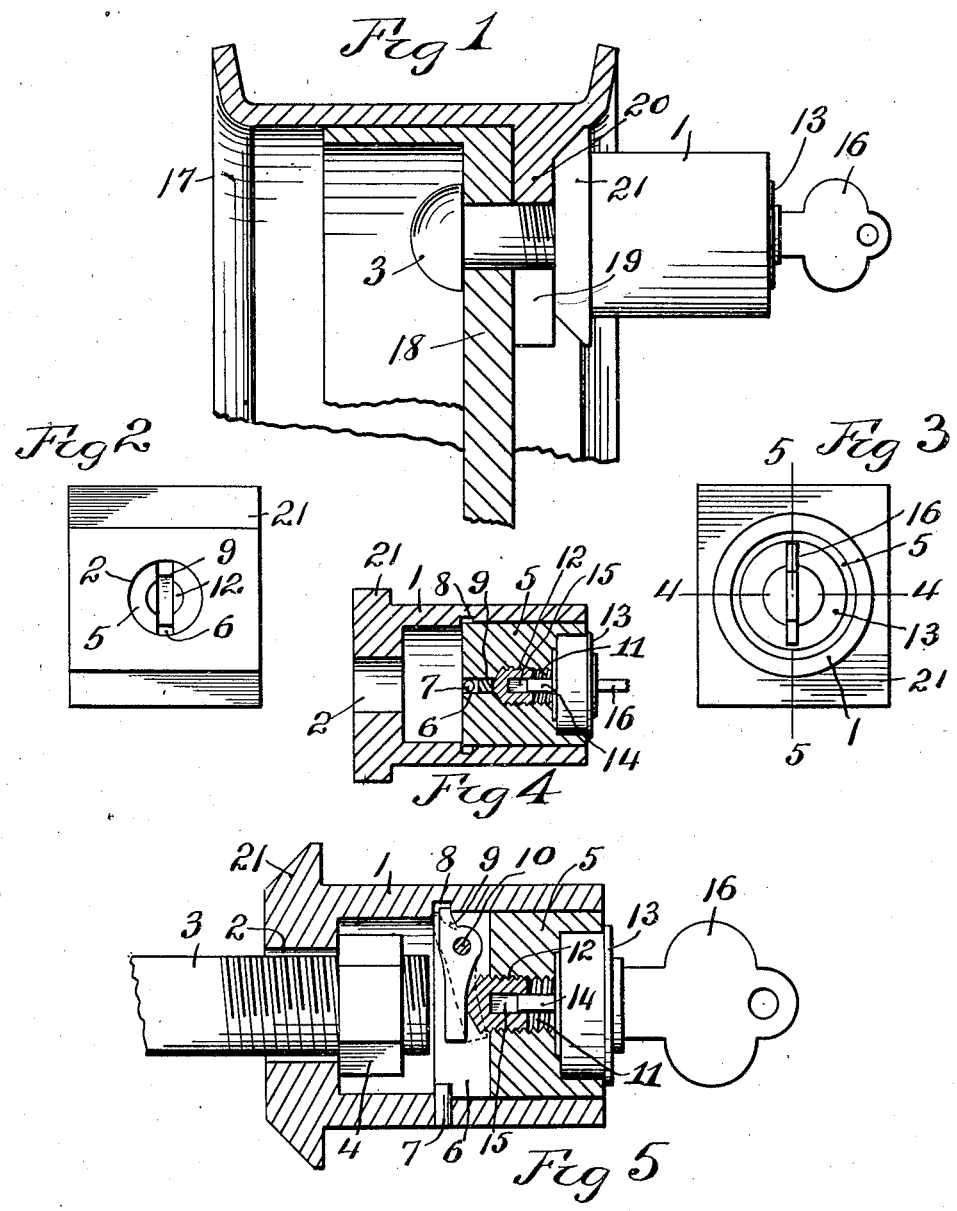

Patented Feb. 25, 1930

1,748,422

UNITED STATES PATENT OFFICE

CHARLES A. LEE, OF KANSAS CITY, KANSAS

LOCKING MECHANISM

Application filed April 4, 1928. Serial No. 267,268.

My invention relates to improvements in locking mechanisms. While it may be used to advantage for preventing the removal of a nut from a bolt on different mechanisms, it is particularly well adapted for preventing the unauthorized removal of the nut from a bolt employed to fasten an automobile tire rim to an automobile wheel or to the rack upon which spare tires are mounted.

One object of my invention is to provide a novel locking mechanism of the kind described having a shell for receiving a bolt having a nut enclosed by the shell, the latter having novel means by which access to the nut, for the unscrewing thereof is prevented.

A further object of my invention is to provide a novel locking mechanism of the kind described, which is simple, cheap, strong, durable, not likely to get out of order, which can be readily and quickly placed in and removed from its operative position on a bolt, and which is efficient in operation.

In the accompanying drawing, which illustrates the preferred embodiment of my invention, Fig. 1 is a side elevation of my improved locking mechanism shown mounted on a bolt which fastens a rim on a spare tire rack, the latter and the rim being shown in vertical section and partly broken away.

Fig. 2 is an inside end elevation of my improved mechanism.

Fig. 3 is an outside end elevation of the same.

Fig. 4 is a section on the line 4—4 of Fig. 3.

Fig. 5 is an enlarged section on the line 5—5 of Fig. 3.

Similar reference characters designate similar parts in the different views.

1 designates a shell having in one end a central hole 2 adapted to receive therethrough a bolt 3 on which is adapted to be mounted a nut 4 which is enclosed by the shell, and which is adapted for insertion and removal through the other open end of the shell 1.

For removably closing the open end of the shell 1 to prevent access to the nut 4 to remove it from the bolt 3, there is provided a closure member 5 slidably fitted in the shell 1, and having across its inner end a groove 6 into which extends a pin 7 mounted in the shell 1, and which holds the member 5 from turning in the shell.

The inner wall of the shell 1 is provided with a recess 8, which is adapted to receive therein the outer end of a locking member 9, which is pivoted in the groove 6 on a pin 10 mounted in the member 5.

The member 5 is provided with a central longitudinal hole 11, the inner end portion of which is threaded and has fitted revolubly in it a screw 12 the inner end of which is adapted to bear against the adjacent side of the locking member 9, whereby, when the screw is turned in the proper direction and to the proper position, the locking member 9 will be positioned, as shown in solid lines in Fig. 5, with its outer end in the recess 8, thus holding the member 5 from being withdrawn from the shell 1.

The outer end of the hole 11 is enlarged and has mounted in it the casing 13 of a lock which is provided with a central rotatable bolt 14, which is other than circular in cross section, and which extends into and is slidable in an axial hole 15 in the the outer end of the screw 12, said bolt being fitted in the hole 15, so that the screw will turn with the bolt.

The bolt 14 is adapted to be turned by a key 16 adapted to be removably fitted in the casing 13.

17 designates a portion of a tire rim, shown mounted on a tire rack 18, a portion only of which is shown, and which is of the usual type employed to hold spares.

The bolt 3 extends in the usual manner through a hole provided therefor in the rack 18 and through the usual slot 19 in the inner end of the rim lug 20.

The casing or shell 1 is first slipped onto the threaded end of the bolt 3. The inner end of the shell 1 is provided with a rectangular head 21 one edge of which bears against the inner wall of the rim 17, which thus holds the shell 1 from turning on the bolt 3. The inner end of the shell bears against the outer side of the lug 20.

The member 5 being removed from the shell 1, the nut 4 may be inserted into the shell 1 and upon the bolt 3, on which it may be turned by the usual socket wrench, not shown, so as to bear against the inner end of the shell 1 and thus hold the latter tightly against the lug 20.

The member 5 is then slipped into the shell 1 in a position such that the pin 7 will enter the groove 6.

The key 16 is then turned so as to turn the rotary bolt 14 in a direction such that the screw 12 will be turned thereby in a direction such that the screw will move inwardly, and thus force the locking member 9 from the unlocked position, shown in dotted lines in Fig. 5 to the locked position shown in solid lines in said figure, in which latter position, the outer end of the member 9 will enter the recess 8, and thereby releasably hold the member 5 from removal from the shell 1. The key 16 is then removed from the lock, and the member 5 will prevent access to the nut 4, so that the nut can not be feloniously removed from the bolt 3, and the rim can not be removed from the rack 18.

To remove the rim, the key 16 is reinserted into the lock casing 13 and turned so as to have the bolt 14 turn the screw 12 so that the screw will retract from the locking member 9 to permit the latter to be able to reassume the realeased position, shown in dotted lines in Fig. 5. The member 5, which is the lock supporting member, can now be withdrawn from the shell 1, after which the socket wrench may be inserted into the shell 1 and engaged with the nut 4 to turn the latter so as to unscrew it from the bolt 3. After the nut has been removed from the bolt, the shell 1 may be removed from the bolt 3, and the rim 17 removed from the rack 18.

I do not limit my invention to the structure shown and described, as many modifications, within the scope of the appended claims, may be made without departing from the spirit of my invention.

What I claim is:—

1. In a locking mechanism, a shell having an open end, a screw supporting member insertible into and removable from said open end and having in its inner end a transverse groove 6 extending to the periphery of said member, the latter having a longitudinal threaded hole, said well having in its inner wall a recess registering with said groove, said shell having a pin extending into said groove for holding said member from revolving, a locking lever pivoted in said groove to said member, and adapted, when swung to the locking position to enter said recess for holding said member from being withdrawn from said shell, a screw fitted in said threaded hole and adapted, when turned in the proper direction, to engage and force said lever to the locking position, and key operated means engaging said screw for turning the latter to and from the locking position.

2. In a locking mechanism of the type having a shell adapted to hold a tire rim against a support therefor having a bolt extending into the shell, and a nut insertible into the shell and mounted on the bolt and holding the shell against the rim; a shell having an open end and a recess in its inner wall, a member insertible into and removable from said open end for closing the latter, and having a threaded hole, a lever pivoted to said member, and adapted when swung to the locking position to enter said recess and hold said member from withdrawal from said shell and disposed in alinement with said threaded hole, a screw fitted in said threaded hole and arranged, when turned in the proper direction to engage said lever and swing the lever to the locking position, and key operated means for turning said screw to and from the locking position.

In testimony whereof I have signed my name to this specification.

CHARLES A. LEE.